3,111,375
PROCESS FOR THE SEPARATION OF THORIUM, CERIUM AND RARE EARTHS STARTING FROM THEIR OXIDES OR HYDROXIDES
Friedrich Gottdenker, Av. 9 de Julho 3476, and Pawel Krumholz, Rua Maestro Elias Lobo 241, both of Sao Paulo, Brazil
No Drawing. Continuation of application Ser. No. 755,895, Aug. 19, 1958. This application Oct. 19, 1961, Ser. No. 146,360
Claims priority, application Brazil Sept. 2, 1957
2 Claims. (Cl. 23—14.5)

The separation of cerium from the other rare earths is accomplished almost exclusively by oxidizing the cerium to the ceric state, taking advantage of the fact that ceric hydroxide or certain ceric salts are much less soluble in acids than the hydroxides and salts of the trivalent rare earths. For instance, cerium contained in a mixture of rare earth hydroxides can be oxidized to ceric oxide by heating to a temperature around 100°, in the presence of oxygen. The trivalent rare earths can then be preferentially dissolved with an acid and thus separated from the quadrivalent cerium oxide. Rare earths are in their minerals like monazite mostly accompanied by thorium as well as by small quantities of uranium. All of the methods so far known and used for the separation of cerium from the other rare earths require the previous separation of thorium from the rare earths.

The new process object of this invention differs from this practice radically. The trivalent rare earths are first separated from the cerium plus the thorium. In a second step the cerium is then separated from the thorium. The new process object of this invention is not only much simpler than the processes so far in use but above all much more economical, requiring much fewer chemicals as well as less labor. It can be applied to a mixture of hydroxides or oxides, as obtained by an alkaline attack of monazite, without however being limited to this raw material.

According to this invention, the mixture of the oxides or hydroxides of the rare earths and of thorium resulting from an alkaline attack of monazite is, after drying, heated in the presence of air to a temperature above 100°, preferably between 130° and 140°, thus transforming the cerium contained in the mixture into ceric oxide. The oxide mixture is thereupon mixed with water and the trivalent rare earths solubilized by adding hydrochloric or nitric acid. This dissolution is preferentially carried out at a temperature between 50° and 70°, using sufficient acid to bring the final pH to between 2 and 3.

As thorium is partially solubilized at this pH, the pH of the mixture is adjusted to a value between 4 and 5 by adding an alkali or ammonium hydroxide or carbonate, or rare earth hydroxides or carbonates, thus reprecipitating the solubilized thorium.

After filtering and washing, the filter cake contains the whole thorium, practically all of the uranium and 96% to 99% of the cerium contained in the original material. The solution contains 90% or more of the trivalent rare earths, around one percent of the cerium and is practically exempt from thorium and uranium. The rare earths contained in the solution can either be recovered by evaporation or by precipitation, or otherwise the solution obtained can be used directly for the separation of the individual rare earths.

The separation of the cerium and the thorium contained in the filter cake is, according to the present invention, carried out by dissolution in the presence of a reducing agent, followed by a preferential precipitation of the thorium. We found and it is an object of this invention, that the mixture of ceric and thorium hydroxides can be dissolved by heating with hydrochloric acid, using a sufficient excess of the latter to maintain a final acidity of at least 0.5 M. Under these conditions, the hydrochloric acid itself acts as reducing agent, it being oxidized to free chlorine. The solution thus obtained can be separated either by filtration or by decantation from insoluble material. The thorium is then separated from the then trivalent cerium by precipitation as a hydroxide or as a basic salt, neutralizing the solution with an alkali or ammonium hydroxide or carbonate, or with the corresponding cerium compound, to a final pH of around 4. The cerium contained in the solution can be recovered by one of the known means, such as evaporation or precipitation of its carbonate, double sulfate etc.

Instead of using hydrochloric acid itself as a reducing agent, an additional reducing agent can be used to reduce the quadrivalent cerium. We found what was so far unknown and is another object of this invention, that the ceric oxide can be conveniently reduced and solubilized by treating with hydrochloric acid and alcohol, such as ethanol or, preferably, methanol, which is used in almost stoichiometric quantities and using only a small excess of the acid, so that the final pH of the solution is around 1. Other convenient reducing substances are, according to this invention, sugars, such as glucose. In the case of using glucose as a reducing agent and working at temperatures between 80° and 100°, it is even possible and another object of this invention, to dissolve the cerium preferentially leaving the greater part of the thorium insoluble in the form of its hydroxide or basic salt. This represents an additional economy in chemicals. Finally, the quadrivalent cerium can be reduced and solubilized by using sulfur dioxide as reducing substance. However, owing to the limited solubility of cerium sulfate and to other factors, a satisfactory separation of cerium and thorium in a sulphuric environment can only be obtained by maintaining certain working conditions, as described in this invention. According to this invention, the mixed hydroxides of cerium and thorium are suspended in water and a quantity of sulphuric acid, necessary to dissolve the cerium (and the other rare earths) and the thorium is added, under discount of the quantity of sulphuric acid formed by the oxidation of the sulfur dioxide used. Then, the latter is introduced into the mixture until the filtered solution indicates a slight excess of same, maintaining between 40 and 45°. The final pH of the solution should be around 2. The quantity of water used is such, that the solution contains a maximum of 60 g. rare earths oxides per liter, preferably around 45 g. The obtained solution can, but need not, be filtered from the insoluble and the thorium precipitated with ammonium hydroxide until the pH of the solution remains around 6 and a sample of the filtered solution is free of thorium. Under these circumstances over 90% of the uranium contained in the original material accompanies the thorium. The thorium precipitate is filtered, washed and the cerium recovered from the solution by one of the above described methods. In a similar manner, sulfur dioxide can be used as a reducing agent, together with hydrochloric acid as solvent.

The following examples illustrate the process of this invention:

*Examples*

(1) A mixture of hydroxides of rare earths and of thorium, obtained by an alkaline attack of monazite and containing around 920 kg. of rare earths oxides, of which 47% represent cerium oxide and about 80 kg. thorium oxide, besides smaller impurities, such as iron oxide, phosphorus pentoxide and a small quantity of unattacked mineral, was dried to a powdery stage. The material is ground and thereupon heated in a shelf-dryer during 16 to 24 hours at 120°, until an analysis of the product shows that over 99% of the cerium is oxidised. The oxidation can be speeded up and accomplished in 4 to 6 hours, by using a rotatory dryer or one equipped with a mechanical agitator and heated to 140°.

After cooling, the mixture of the oxides is suspended in 1700 liters of water or wash water originating from a previous operation. Then, under efficient agitation, concentrated hydrochloric acid is added at a rate of about 100 l. per hour, until the solution maintains a pH of 1.8 to 2.2.

The quantity of hydrochloric acid consumed corresponds to about 1050 kg. acid of 20° Bé. The solution is agitated during one hour and then neutralized with ammonia of 1%, until a final pH of 3.8 to 4.2. The solution is filtered in a wooden filter press and washed with about 2000 l. of water, adding part of the wash-water to the filtrate, and using the remainder in the dissolution of a following charge. The washing operation is continued until the filtrate becomes exempt from rare earths, recovering these by precipitation with sodium carbonate.

The main filtrate contains 120 to 150 g./l. of rare earth oxides of which only about 1% is cerium.

(2) The mixture of ceric and thorium hydroxides, respectively basic salts, resulting from the previous operation and which contains about 430 kg. of ceric oxide, 40 kg. of trivalent rare earth oxides and 80 kg. of thorium oxide, is mixed in a glass-lined vessel equipped with an agitator and connected with a chlorine absorption system, with 1200 l. of concentrated hydrochloric acid. The mixture is now slowly heated to 80°, maintaining this temperature until the evolution of the chlorine ceases completely. The excess chlorine which remains in the solution is removed by an air current passed through the solution. Thereafter, 1 molar ammonia is added, until a pH 5 is reached. The solution is filtered in a filter press and the cake washed until the filtrate becomes exempt from cerium. The filter cake contains the whole thorium, about 10% cerium on its thorium content as well as about 90% of the uranium contained in the original material. The cerium chloride solution is heated to 80° and the cerium precipitated with sodium carbonate as carbonate.

(3) The hydroxide mixture used in Example 2 is mixed in a glass-lined vessel equipped with an agitator and a reflux condenser, with 500 l. of water, adding thereupon 51 l. of methanol. The mixture is heated to 70° and 840 l. of concentrated hydrochloric acid is added in two hours, maintaining the temperature between 80° and 85°. After one hour, 2 molar ammonia is added until a pH of 4.6 is reached. The mixture is filtered in a wooden filter-press and the cake washed until the filtrate is exempt from rare earths. The solution is evaporated in a cast iron pan to a boiling point of 140°, thus obtaining a hydrated cerous chloride, containing as only impurity ammonium chloride.

(4) In a rubber-lined vessel, the hydroxide used in Examples 2 and 3, are mixed with 1000 l. of water, adding 46 kg. of glucose. The mixture is heated to 60°, thereupon 850 l. of concentrated hydrochloric acid are added within three hours, maintaining the temperature below 75°.

The mixture is filtered, in order to separate the solution from the small quantity of unattacked mineral. The filtered solution is heated to 70° in a wooden vessel and 20% of sodium carbonate solution is added until reaching a pH of 4.2. The thorium hydroxide precipitate is separated from the solution by filtration and washed with water until no more rare earths can be detected in the filtrate. The rare earths solution is heated to 90° and the cerium precipitated as carbonate, as described in Example 2.

(5) The mixture of hydroxides used in Examples 2 to 6 is mixed in a glass-lined recipient with the minimum of water necessary and 55 kg. of glucose are added. The mixture is heated with direct steam to 90°, after which 600 l. of concentrated hydrochloric acid are added during three hours. The mixture is maintained near the boiling point during six hours. The mixture is diluted with half its volume of water and the thorium precipitated by the addition of 1 N ammonia. The treatment hereafter is identical to that described in the previous examples. The thorium precipitate is less pure than that obtained in the previous examples, containing up to 20% cerium on the thorium oxide. The consumption of chemicals is, however, considerably less, as the greater part of the thorium remains, insoluble.

(6) The hydroxides used in the previous examples are mixed in a wooden vessel with 8500 l. of water, 330 kg. of sulphuric acid are added, heating the mixture, if necessary, to 42°. About 85 kg. of sulfur dioxide are introduced, until a sample of the filtered solution indicates a content of 0.05 g./l. of $SO_2$. The final pH of the solution should be between 1.8 and 2.2.

The mixture is filtered and ammonia of 1% is added to the solution, until a pH of 6.1, thus precipitating the thorium together with at least 90% of the uranium contained in the solution. The mixture is then filtered in a filter press and the cake washed with 3000 l. of water. The filtrate is heated to 60° and 550 kg. of sodium sulfate is added. The cerium sodium double sulfate thus precipitated is filtered in a vacuum filter and washed with little water.

This application is a continuation of our application Serial Number 755,895, filed August 19, 1958.

What is claimed is:

1. A method of separating thorium, cerium and the rare earths from a mixture including the same obtained from the alkaline attack of monazite in the form of oxides and hydroxides of thorium, cerium and rare earths, consisting in the steps of subjecting said mixture including thorium, cerium and rare earth compounds, said compounds being selected from the group consisting of oxides and hydroxides to oxidation by oxygen at a temperature above 100° C. so as to convert the cerium in said mixture to tetravalent ceric oxide; treating the thus formed mixture with an acid selected from the group consisting of hydrochloric acid and nitric acid in an amount sufficient to obtain a final pH of 2 to 3 so as to selectively dissolve the rare earths from said mixture while precipitating insoluble thorium and tetravalent cerium compounds; adjusting the pH of the thus formed solution to 4 to 5; separating said thorium and tetravalent cerium precipitated compounds from the solution; reacting said insoluble thorium and tetravalent cerium compounds under reducing conditions with a reducing agent plus acid reactant mixture selected from the group consisting of (a) reactant mixtures selected from the group consisting of methanol, ethanol and glucose plus hydrochloric acid, and (b) reactant mixtures consisting of sulfur dioxide plus an acid selected from the group consisting of hydrochloric acid and sulfuric acid so as to convert said tetravalent cerium to the trivalent state; treating the thus formed solution with an alkaline agent so as to selectively precipitate the thorium compounds therefrom; and separating said insoluble thorium compounds from the thus remaining solution of said trivalent cerium compounds from which said cerium can be recovered.

2. A method of separating thorium, cerium and the rare earths from a mixture including the same obtained from the alkaline attack of monazite in the form of oxides and hydroxides of thorium, cerium and rare earths, consisting in the steps of subjecting said mixture including thorium, cerium and rare earth compounds, said compounds being selected from the group consisting of oxides and hydroxides to oxidation by oxygen at a temperature above 100° C. so as to convert the cerium in said mixture to tetravalent ceric oxide; treating the thus formed mixture with an acid selected from the group consisting of hydrochloric acid and nitric acid in an amount sufficient to obtain a final pH of 2 to 3 so as to selectively dissolve the rare earths from said mixture while precipitating insoluble thorium and tetravalent cerium compounds; adjusting the pH of the thus formed solution to 4 to 5; separating said thorium and tetravalent cerium precipitated compounds from the solution; reacting said insoluble thorium and tetravalent cerium compounds with a reducing agent selected from the group consisting of methanol, ethanol and glucose, and with hydrochloric acid under reducing conditions so as to convert said tetravalent cerium to the trivalent state; treating the thus formed solution with an alkaline agent so as to selectively precipitate the thorium compounds therefrom; and separating said insoluble thorium compounds from the thus remaining solution of said trivalent cerium compounds from which said cerium can be recovered.

No references cited.